(12) United States Patent
Shin et al.

(10) Patent No.: US 12,438,227 B2
(45) Date of Patent: Oct. 7, 2025

(54) BATTERY PACK AND DEVICE INCLUDING THE SAME

(71) Applicant: LG ENERGY SOLUTION, LTD., Seoul (KR)

(72) Inventors: Juhwan Shin, Daejeon (KR); Hyoungsuk Lee, Daejeon (KR); Donghyun Kim, Daejeon (KR); Byung Do Jang, Daejeon (KR); Yongho Chun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 561 days.

(21) Appl. No.: 17/772,096

(22) PCT Filed: Apr. 13, 2021

(86) PCT No.: PCT/KR2021/004660
§ 371 (c)(1),
(2) Date: Apr. 26, 2022

(87) PCT Pub. No.: WO2021/221351
PCT Pub. Date: Nov. 4, 2021

(65) Prior Publication Data
US 2022/0407170 A1    Dec. 22, 2022

(30) Foreign Application Priority Data

Apr. 29, 2020 (KR) .......................... 10-2020-0052257

(51) Int. Cl.
H01M 50/342 (2021.01)
H01M 50/24 (2021.01)
(Continued)

(52) U.S. Cl.
CPC ....... H01M 50/3425 (2021.01); H01M 50/24 (2021.01); H01M 50/35 (2021.01);
(Continued)

(58) Field of Classification Search
None
See application file for complete search history.

(56) References Cited

U.S. PATENT DOCUMENTS

2009/0197153 A1    8/2009  Fujikawa et al.
2012/0015218 A1*   1/2012  Lee ....................... H01M 50/30
                                                    429/53
(Continued)

FOREIGN PATENT DOCUMENTS

CN   210110904 U   2/2020
CN   203941956 U   6/2025
(Continued)

OTHER PUBLICATIONS

International Search Report for PCT/KR2021/004660 (PCT/ISA/210) mailed on Jul. 29, 2021.

*Primary Examiner* — Alix E Eggerding
(74) *Attorney, Agent, or Firm* — Birch, Stewart, Kolasch & Birch, LLP

(57) ABSTRACT

Discussed is a battery pack including a plurality of battery modules; a venting inducing frame disposed along edges of the plurality of battery modules and forming a venting passage to vent at least one of gas and flame; a venting gate to connect an inside of at least one of the plurality of battery modules and the venting inducing frame; and a quenching member disposed in a passage of the venting gate.

17 Claims, 13 Drawing Sheets

(51) Int. Cl.
  *H01M 50/35* (2021.01)
  *H01M 50/383* (2021.01)

(52) U.S. Cl.
  CPC ...... *H01M 50/383* (2021.01); *H01M 2200/20* (2013.01); *H01M 2220/20* (2013.01)

(56) References Cited

U.S. PATENT DOCUMENTS

| | | | |
|---|---|---|---|
| 2012/0164490 | A1 | 6/2012 | Itoi et al. |
| 2012/0288738 | A1 | 11/2012 | Yasui et al. |
| 2014/0113167 | A1 | 4/2014 | Itoi et al. |
| 2015/0064514 | A1 | 3/2015 | Wu et al. |
| 2015/0140369 | A1 | 5/2015 | Itoi et al. |
| 2018/0233790 | A1 | 8/2018 | Son |
| 2019/0097192 | A1 | 3/2019 | Kim et al. |
| 2019/0140235 | A1* | 5/2019 | Lindstrom .......... H01M 10/613 |
| 2020/0052252 | A1 | 2/2020 | Smith et al. |
| 2020/0185672 | A1* | 6/2020 | Seo ................ H01M 10/6568 |
| 2020/0280035 | A1 | 9/2020 | Park et al. |
| 2021/0226295 | A1 | 7/2021 | Kwon et al. |
| 2021/0288372 | A1* | 9/2021 | Kim .................. H01M 10/6561 |
| 2021/0402884 | A1* | 12/2021 | Wang .................. H01M 50/358 |
| 2022/0140432 | A1* | 5/2022 | Chen .................. H01M 50/209 429/53 |

FOREIGN PATENT DOCUMENTS

| | | |
|---|---|---|
| JP | 2009-212081 A | 9/2009 |
| JP | 2012-79510 A | 4/2012 |
| JP | 2014-241245 A | 12/2014 |
| JP | 2016-534518 A | 11/2016 |
| JP | 2020-42982 A | 3/2020 |
| KR | 10-2012-0090027 A | 8/2012 |
| KR | 10-2015-0031611 A | 3/2015 |
| KR | 10-2015-0139440 A | 12/2015 |
| KR | 10-2017-0003754 A | 1/2017 |
| KR | 10-2017-0090261 A | 8/2017 |
| KR | 10-2019-0022485 A | 3/2019 |
| KR | 10-2019-0036260 A | 4/2019 |
| KR | 10-2019-0118017 A | 10/2019 |
| KR | 10-2019-0122474 A | 10/2019 |
| WO | WO2012/081137 A1 | 8/2012 |
| WO | WO 2018186616 * | 10/2018 |
| WO | WO-2018186616 A1 * | 10/2018 .............. B60L 50/66 |

\* cited by examiner

BATTERY PACK AND DEVICE INCLUDING THE SAME

TECHNICAL FIELD

This application claims priority to and the benefit of Korean Patent Application No. 10-2020-0052257 filed in the Korean Intellectual Property Office on Apr. 29, 2020, the entire contents of which are incorporated herein by reference.

The present invention relates to a battery pack and a device including the same, and in particular, it relates to a safety-improved battery pack and a device including the same.

BACKGROUND ART

Rechargeable batteries having high application characteristics and electrical characteristics such as high energy density according to their products are widely applied to battery vehicles, hybrid vehicles, and electric power storage devices driven by electric driving sources, as well as portable devices. These rechargeable batteries are attracting attention as new energy sources for improving environmental friendliness and energy efficiency in that they do not generate any by-products of energy use, as well as their primary merit that they can drastically reduce the use of fossil fuels.

The commercially available secondary batteries include a nickel cadmium battery, a nickel hydrogen battery, a nickel zinc battery, and a lithium secondary battery, and the lithium secondary battery among them scarcely generates a memory effect compared to the nickel-based secondary battery so it is freely charged and discharged, a self-discharge rate is very low, and an energy density is high as merits.

The lithium secondary battery generally uses a lithium-based oxide and a carbon material as a positive active material and a negative active material, respectively. The lithium secondary battery includes an electrode assembly in which a positive electrode plate and a negative electrode plate on which the positive active material and the negative active material are respectively applied are disposed with a separator therebetween, and an exterior material, that is, a battery case, for sealing and receiving the electrode assembly together with an electrolyte solution.

In general, the lithium secondary battery may be classified into a cylindrical or square-type secondary battery of which the electrode assembly is installed in a metal can, and a pouch-type secondary battery of which the electrode assembly is installed in a pouch of an aluminum laminate sheet, depending on a shape of the exterior material.

Recently, as needs for a large-capacity secondary battery structure increase in addition to the use as an energy storing source of the secondary battery, needs for the battery packs in a medium to large module structure in which battery modules in which a plurality of secondary batteries are coupled in series or in parallel are gathered are increasing. Capacity and outputs of the battery modules are improved by coupling a plurality of battery cells in series or in parallel and configuring a battery cell stacked body. Further, a plurality of battery modules may configure a battery pack when installed together with various control and protection systems such as a battery management system (BMS) or a cooling system.

The battery pack has a structure in which a plurality of battery modules are combined, so when some of the battery modules receive an overvoltage or an overcurrent or they are overheated, safety and operation efficiency of the battery pack may be problematic. Particularly, while the capacity of the battery pack is in the increasing trend to improve mileage and energy inside the pack is accordingly increasing, there is a need to design a structure satisfying reinforcing safety standards and obtaining safety of vehicles and drivers. For this purpose, the need for acquiring a structure for preventing an internal thermal runaway in advance, and minimizing corresponding damages when the thermal runaway is generated, is particularly on the rise.

DISCLOSURE

The present invention has been made in an effort to provide a safety-improved battery pack and a device including the same.

However, the objective of the present invention is not limited to the aforementioned one, and may be extended in various ways within the spirit and scope of the present invention.

An embodiment of the present invention provides a battery pack including: a plurality of battery modules; a venting inducing frame disposed along an edge of the battery modules and forming a venting passage; and a venting gate for connecting an inside of the battery modules and the venting inducing frame, wherein a quenching member is formed on a passage of the venting gate.

The quenching member may be made of a quenching mesh.

The venting inducing frame may include a pair of vertical beams formed in parallel to a first direction and a pair of horizontal beams formed in parallel to a second direction traversing the first direction, and the vertical beams and the horizontal beams respectively having a pipe shape may include a cover formed in length directions of the vertical beams and the horizontal beams, and a passage surrounded by the cover and formed to allow gas to pass through.

The battery pack may further include at least one rupture portion connected to the passage on an outside of one of the horizontal beams and the vertical beams.

A passage of the venting gate and a passage of the rupture portion may be formed to cross each other.

The cover of the horizontal beams may include at least one first connection hole facing the battery module, and the venting gate may be formed so that a pipe shape of the venting gate may communicate with a pipe shape of the horizontal beams facing the first connection hole.

A second connection hole communicating with a passage of another of the vertical beams and the horizontal beams may be installed on a cover of one of the vertical beams and the horizontal beams on a portion where the vertical beams traverse the horizontal beams.

The battery pack may further include a pack housing for receiving the battery modules and the venting inducing frame, wherein the pack housing may include an upper cover and a lower housing, and a pack gasket may be formed between the upper cover and the lower housing.

The battery modules may include an end plate for covering a battery cell stacked body exposed on a front side and a rear side of a module frame, an opening may be formed in part of the end plate, and the venting gate may be connected to an opening of the end plate.

A gate gasket may be formed between the venting gate and the end plate.

Another embodiment of the present invention provides a device including the above-described battery pack.

According to the embodiments, the venting inducing structure is provided in the battery pack, so when an abnormal phenomenon is generated in the battery cell, the safety of the battery pack may be secured by inducing venting gas in a predetermined direction.

MODE FOR INVENTION

Figure 1:
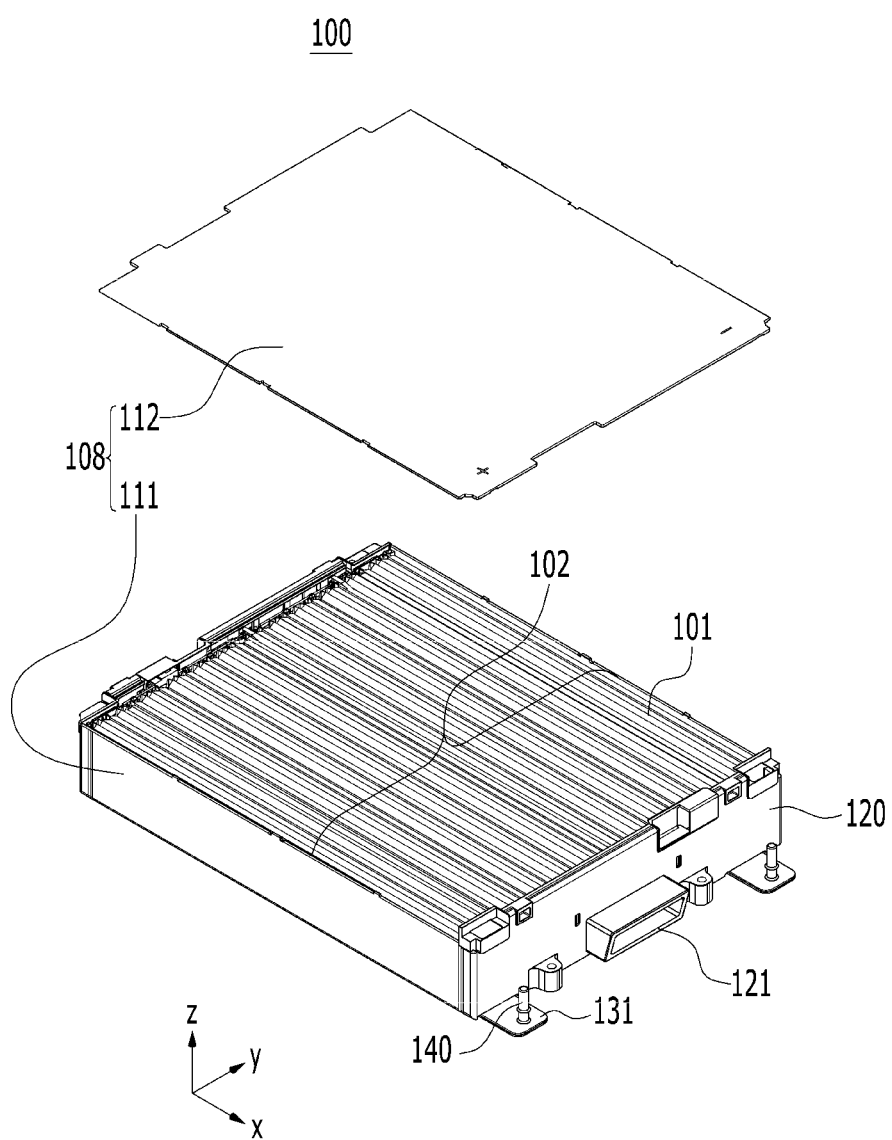
FIG. 1 shows a battery module according to an embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present disclosure.

Parts that are irrelevant to the description will be omitted to clearly describe the present invention, and the same elements will be designated by the same reference numerals throughout the specification.

The size and thickness of each configuration shown in the drawings are arbitrarily shown for better understanding and ease of description, but the present invention is not limited thereto. In the drawings, the thickness of layers, films, panels, regions, etc., are exaggerated for clarity. For ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

Unless explicitly described to the contrary, the word "comprise" and variations such as "comprises" or "comprising" will be understood to imply the inclusion of stated elements but not the exclusion of any other elements.

Further, throughout the specification, the phrase "in a plan view" means viewing a target portion from the top, and the phrase "in a cross-sectional view" means viewing a cross-section formed by vertically cutting a target portion from the side.

Figure 2:
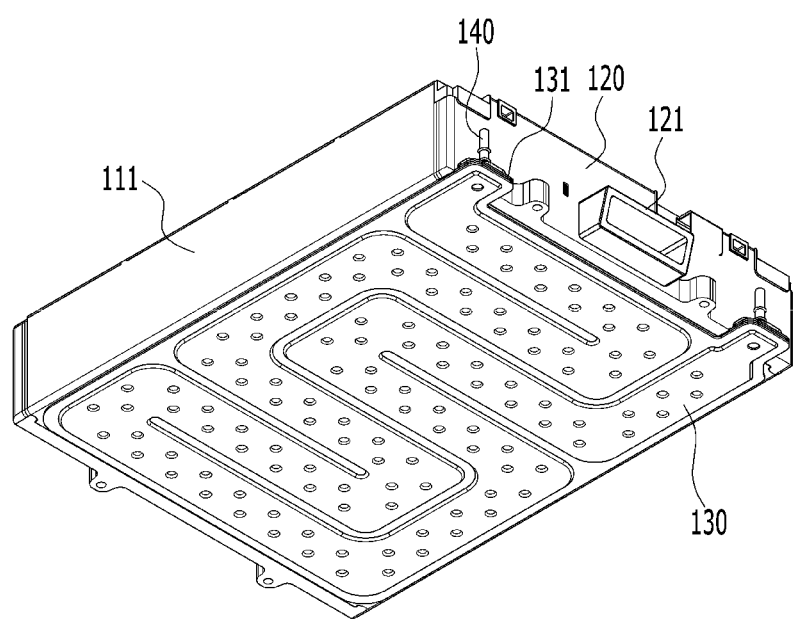
FIG. 2 shows a perspective view of a battery module of FIG. 1 seen from bottom to top in a z-axis direction.

FIG. 1 shows a battery module according to an embodiment of the present invention. FIG. 2 shows a perspective view of a battery module of FIG. 1 seen from bottom to top in a z-axis direction.

Referring to FIG. 1 and FIG. 2, the battery module 100 included in the battery pack of FIG. 1 may include a battery cell stacked body 102 in which a plurality of battery cells 101 are stacked, a module frame 108 for receiving the battery cell stacked body 102, and an end plate 120. The battery cells 101 are stacked to be mutually electrically connected to each other to configure the battery cell stacked body 102. Particularly, as shown in FIG. 1, a plurality of battery cells 101 may be stacked in a direction that is parallel to the y-axis.

In this instance, the battery cell stacked body 102 according to an embodiment of the present invention may be a large-area module including a greater number of the battery cells 101 than the prior art. For example, 48 battery cells 101 may be included per battery module 100. Regarding the large-area module, a horizontal direction length of the battery module becomes long. In this instance, the horizontal direction length may signify a direction in which the battery cells 101 are stacked, that is, the length in the direction that is parallel to the y-axis.

The module frame 108 for receiving the battery cell stacked body 102 may include an upper plate 112 and a lower frame 111. The lower frame 111 may be a U-shaped frame. The U-shaped frame may include a bottom portion and two lateral portions extending upward from respective ends of the bottom portion. The bottom portion may cover a lower side (an opposite direction of a z axis) of the battery cell stacked body 102, and the lateral portions may cover respective lateral sides (the y-axis direction and its opposite direction) of the battery cell stacked body 102.

The upper plate 112 may be formed to have one plate-shaped structure for surrounding a remaining upper side (z-axis direction) excluding the lower side and the respective sides surrounded by the U-shaped frame. The upper plate 112 and the lower frame 111 may be combined to each other by welding while corresponding corners contact each other, thereby configuring a structure for covering the battery cell stacked body 102 from top to bottom and from right to left. The battery cell stacked body 102 may be physically protected through the upper plate 112 and the lower frame 111. For this purpose, the upper plate 112 and the lower frame 111 may include a metallic material with predetermined rigidity.

A venting gate 121 for communicating with an inside of the battery module 100 and releasing a flame or heat that may be generated in the inside is disposed on the end plate 120 according to the present embodiment. The venting gate 121 may be provided on a lower side of the end plate 120 by considering a connector connecting portion for transmitting information. The venting gate 121 may be connected to an opening (not shown) formed on part of the end plate 120 to thus communicate with the inside of the battery module 100.

The module frame 108 may include a module frame protrusion 131 formed so that the bottom portion of the module frame 108 may extend to pass through the end plate 120. In this instance, a coolant input and output by a cooling pot 140 connected to an upper side of the module frame protrusion 131 may be supplied to/discharged from a heat sink 130 through the module frame protrusion 131.

Figure 3:
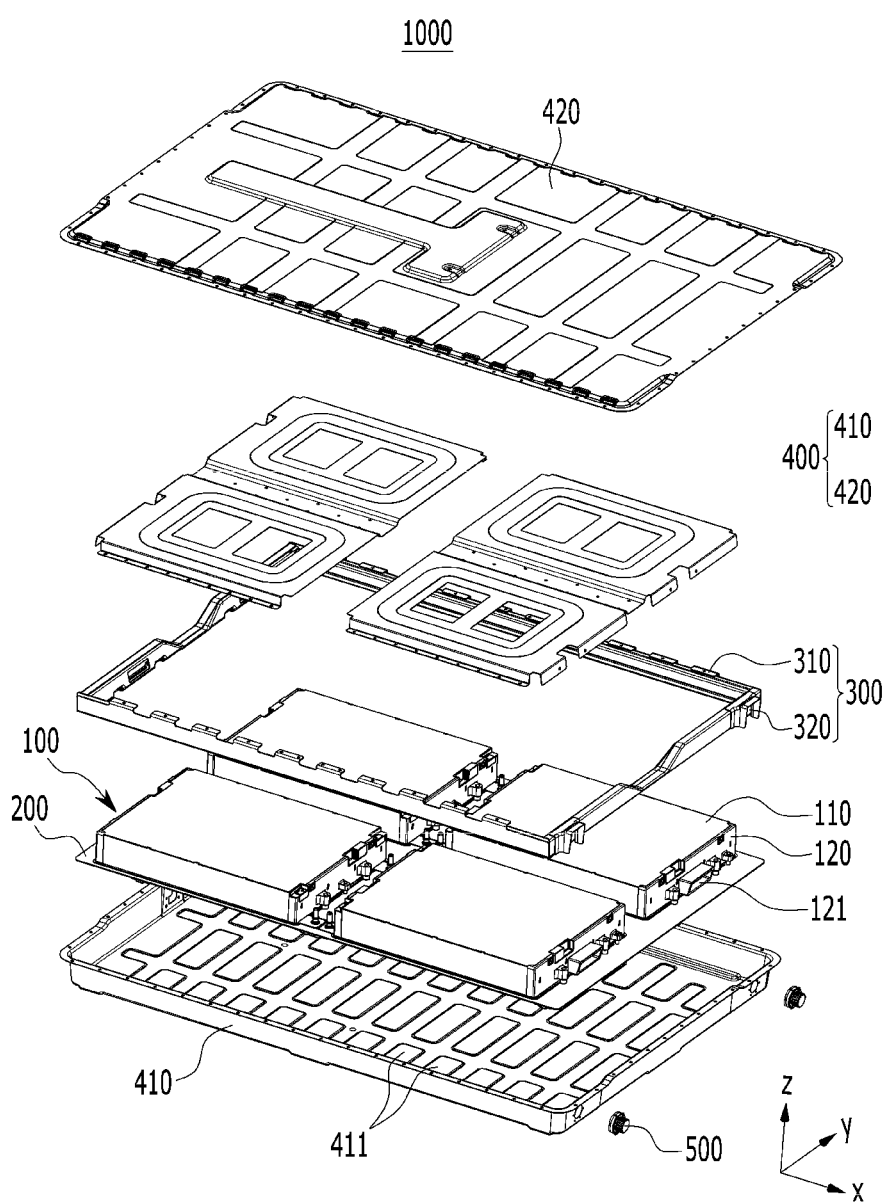
FIG. 3 shows an exploded perspective view of a battery pack according to an embodiment of the present invention.

FIG. 3 shows an exploded perspective view of a battery pack according to an embodiment of the present invention.

Referring to FIG. 3, the battery pack 1000 according to an embodiment of the present invention includes a plurality of battery modules 100, and a venting inducing frame 300 disposed along an edge of a plurality of battery modules 100. The battery modules 100 and the venting inducing frame 300 may be mounted on a pack tray 200 and may be received in a pack housing 400. The pack housing 400 may include a lower housing 410 for receiving the pack tray 200, and an upper cover 420 combined to the lower housing 410 and covering an upper side of the battery module 100. A pack gasket 411 may be formed between the upper cover 420 and the lower housing 410 to seal the inside of the pack housing 400.

The battery modules 100 respectively include a battery cell stacked body-(not shown) disposed in the module frame 110, and include an end plate 120 for covering the battery cell stacked body exposed to the respective ends of the module frame 110. In this instance, one of the respective end plates 120 includes a venting gate 121 communicating with the inside of the battery module 100 and releasing the flame or heat that may be generated from the inside. In the battery pack 1000, the venting gate 121 is disposed to face an external side of the battery pack 1000, and preferably, as shown in FIG. 3, the venting gate 121 may be disposed to face the external side toward the respective ends in the first direction (x-axis direction) in the battery pack 1000.

A venting inducing frame 300 may be disposed along the edge of all the battery modules 100. The venting inducing frame 300 may include a pair of vertical beams 310 and a pair of horizontal beams 320 formed in a pipe shape along the respective sides of the battery pack 1000 and respectively extending in the first direction (x-axis direction) and the second direction (y-axis direction), and they are formed to communicate with each other as a whole body. A detailed configuration of the venting inducing frame 300 will be described in a later portion of the present specification.

The battery modules 100 and the venting inducing frame 300 may be mounted on the pack tray 200, and it may be fixed to the pack tray 200 by a fixation means if needed. The battery module 100, the venting inducing frame 300, and the pack tray 200 may be received in the lower housing 410. The lower housing 410 may include a bottom side on which the pack tray 200 is disposed, and a side wall extending upward from the edge of the bottom side. An upper cover 420 for covering the upper portion of the battery module 100 may be combined to the lower housing 410 to protect an internal electrical field. In this instance, various control and protection systems such as a battery management system (BMS) and a cooling system together with the battery module 100 may be installed in the pack housing 400.

At least one rupture portion 500 for discharging heat or flame generated from the inside to the outside may be formed on one side wall of the lower housing 410. A detailed configuration of the rupture portion 500 will be described in a later portion of the present specification.

A venting inducing frame of a battery pack according to an embodiment of the present invention will now be described in detail.

Figure 4:
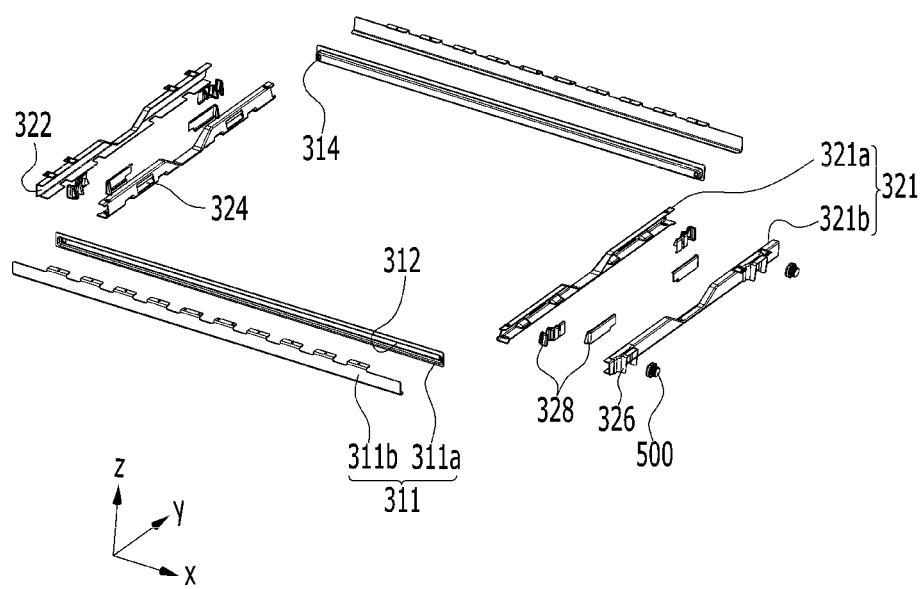
FIG. 4 shows an exploded perspective view of a venting inducing frame in a battery pack of FIG. 3.

FIG. 4 shows an exploded perspective view of a venting inducing frame in a battery pack of FIG. 3.

Referring to FIG. 3 and FIG. 4, the venting inducing frame 300 is formed in a pipe shape along the respective sides of the battery pack 1000, it may include a pair of vertical beams 310 and a pair of horizontal beams 320 respectively extending in the first direction (x-axis direction) and the second direction (y-axis direction), and they are formed to communicate with each other as a whole body.

The vertical beams 310 has a pipe shape lengthily extending in the first direction (x-axis direction), and includes a cover 311 for defining an inside of the pipe shape, and a passage 312 formed inside the cover 311. The cover 311 may include a first internal cover 311a disposed near the battery module 100 in the second direction (y-axis direction), and a first external cover 311b facing the same and disposed to become distant from the battery module 100 in the second direction (y-axis direction). At least one of the first internal cover 311a and the first external cover 311b includes a groove lengthily formed in the first direction. That is, its cross-section is formed to have a " ⊏ " shape (formed to have a shape in which one side is removed from a square pipe shape), and the cover of the other is combined thereto to thus define the passage 312. However, it is not limited thereto as long as the pipe shape may be obtained by the cover 311.

The horizontal beams 320 has a pipe shape lengthily extending in the second direction (y-axis direction), and includes a cover 321 for defining an inside of the pipe shape, and a passage 322 formed inside the cover 321. The cover 321 may include a second internal cover 321a disposed near the battery module 100 in the first direction (x-axis direction), and a second external cover 321b facing the same and disposed to become distant from the battery module 100 in the first direction (x-axis direction). At least one of the second internal cover 321a and the second external cover 321b includes a groove lengthily formed in the second direction That is, its cross-section is formed to have a " ⊏ " shape (formed to have a shape in which one side is removed from a square pipe shape), and the cover of the other is combined thereto to thus define the passage 322. Particularly, in the present embodiment, as shown in FIG. 2, the second internal cover 321a and the second external cover 321b may be respectively formed to have a " ⊏ " shaped cross-section, and by this, rigidity when the horizontal beams 320 are assembled may be increased. However, this is not limited thereto when the pipe shape may be obtained by the cover 321.

The horizontal beams 320 includes a first connection hole 324 formed on the side facing the battery module 100, that is, one side of the second internal cover 321a. The first connection hole 324 is disposed to communicate with the venting gate 121 of the battery module 100. The horizontal beams 320 further includes a third connection hole 326 formed on the side disposed in a direction becoming distant in the second direction from the battery module 100, that is, one side of the second external cover 321b. The third connection hole 326 is disposed so that the rupture portion 500 may communicate with the passage 322. In this instance, the venting path bracket 328 may combine the rupture portion 500 and the horizontal beams 320 to guide the path for the venting gate 121, the passage 322 of the horizontal beams 320, and the rupture portion 500 to communicate with each other.

The vertical beams 310 include a second connection hole 314 formed on the first internal cover 311a at the respective ends disposed near the horizontal beams 320. The passage 322 of the horizontal beams 320 may communicate with the passage 312 of the vertical beams 310 through the second connection hole 314.

The rupture portion 500 is connected to the passage 322 of the horizontal beams 320 and includes a rupture side (510, shown in FIG. 7B) that is broken when input gas has more than a predetermined level of pressure. Further, the rupture portion 500 includes a wing portion (520, shown in FIG. 7B) protruding from a body on which the rupture side 510 is formed and combining to the side wall of the lower housing 410. The wing portion 520 may be fixed to the lower housing 410 by use of a fastening means such as a screw.

In the present embodiment, the rupture portion 500 is connected to the passage 322 of the horizontal beams 320, and the rupture portion 500 is fixed with the horizontal beams 320 and the lower housing 410, and without being limited thereto, configurations for communicating with the passage of the venting inducing frame 300 and discharging to the outside may be appropriately used. Further, the formation of two rupture portions 500 on one of the one pair of horizontal beams 320 is exemplified in the present embodiment, and without being limited thereto, the rupture portion 500 may be installed in the horizontal beams 320 on another side, or it may be installed in the vertical beams 310, and corresponding positions and numbers may be appropriately selected if needed.

By the above-noted configuration, the passage is formed to communicate with all components inside the venting inducing frame 300 in a square shape configured with the vertical beams 310 and the horizontal beams 320, and the passage communicates with the venting gate 121 of the battery module 100 and the rupture portion 500 to induce heat and flame to the outside and minimize the influence to peripheral battery modules when a thermal runaway is generated from the battery module 100. In this instance, the flame included in the generated high-pressure venting gas is combusted while passing through the path inside the venting inducing frame 300 and it may be discharged to the outside in a safer way. In the normal condition without a thermal runaway, the venting inducing frame 300 may function as a support frame for stably supporting the battery module 100 and may improve stability of the battery pack 1000.

A path for controlling a case in which issues such as overvoltage, overcurrent, or overheating are generated in some battery modules in the battery pack will now be described.

Figure 5:
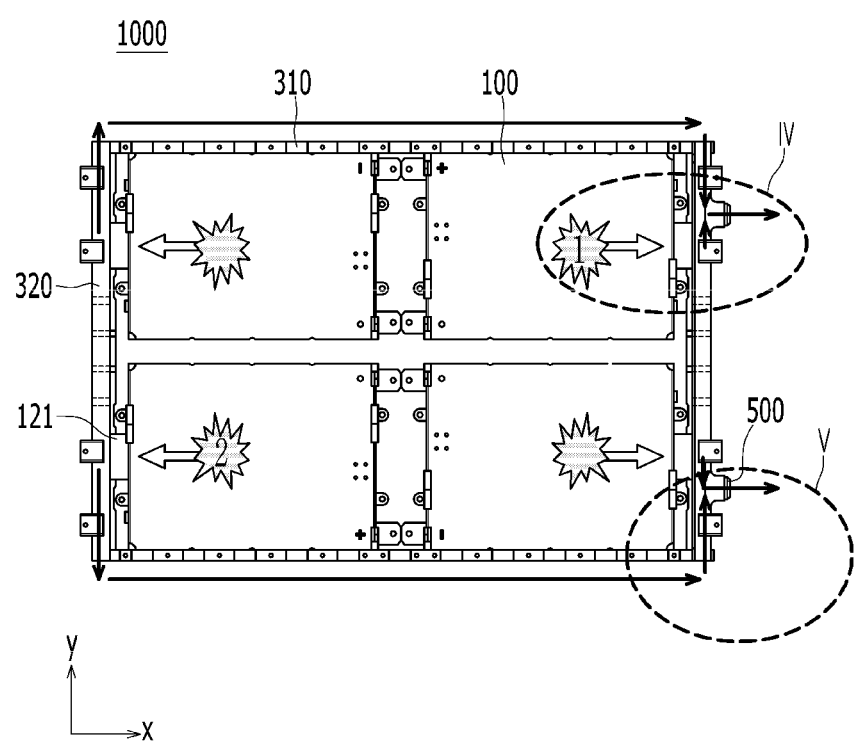
FIG. 5 shows a mimetic diagram of a transfer path when a thermal runaway is generated on a certain module of a battery pack according to an embodiment of the present invention.
Figure 6:
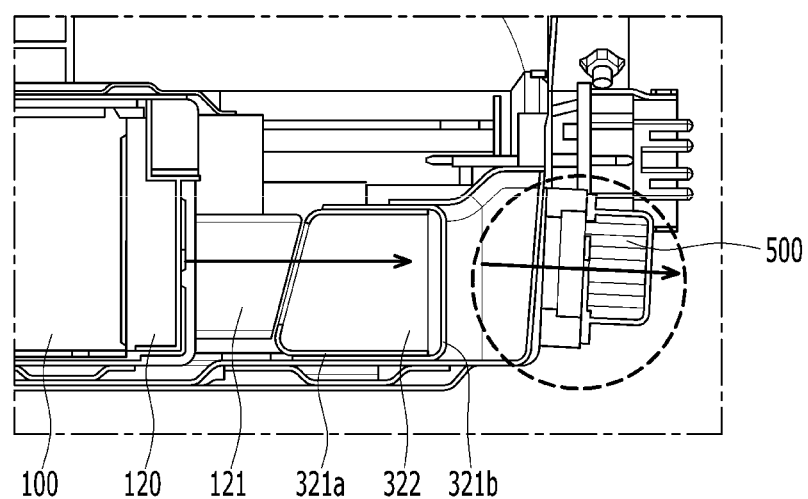
FIG. 6 shows an enlarged portion of IV of FIG. 5.
Figure 7A:
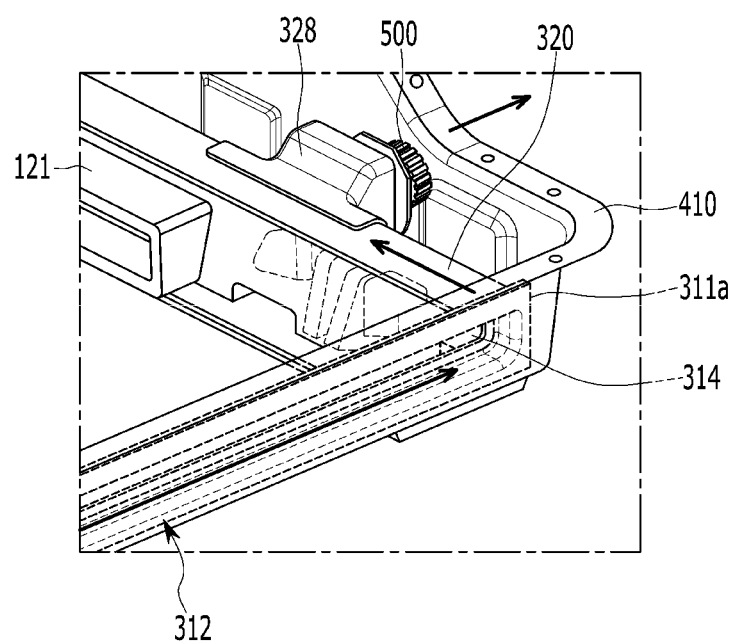
FIG. 7A and FIG. 7B show an enlarged portion of V of FIG. 5.
Figure 7B:
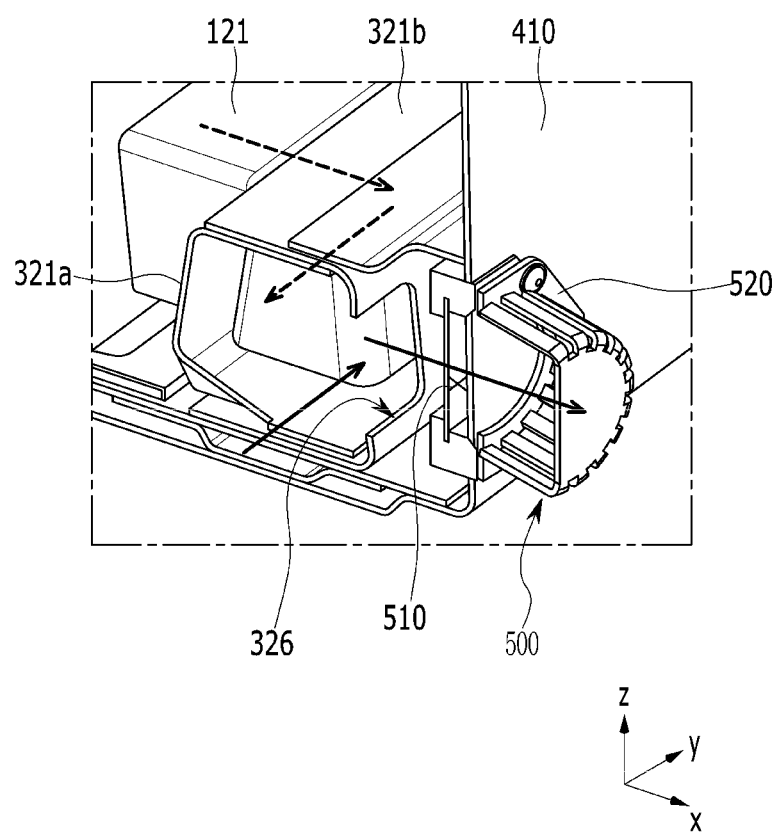

FIG. 5 shows a mimetic diagram of a transfer path when a thermal runaway is generated on a certain module of a battery pack according to an embodiment of the present invention. FIG. 6 shows an enlarged portion of IV of FIG. 5. FIG. 7A and FIG. 7B show an enlarged portion of V of FIG. 5.

Referring to FIG. 3 to FIG. 7, when abnormal phenomena (heat issues) such as overvoltage, overcurrent, or overheating are generated in the battery module 100, high-pressure venting gas is discharged from the inside of the battery module 100 through the venting gate 121. In this instance, high-temperature and high-pressure gas and flames are induced to the first connection hole 324 positioned nearest the venting gate 121 of the battery module 100 in which heat is generated. The high-temperature and high-pressure gas and flames input through the first connection hole 324 may be discharged to the outside through the passage formed on the venting inducing frame 300.

For example, when heat is generated in the battery module 100 disposed on the position 1 in FIG. 5, as shown in FIG. 6, the high-pressure gas and flames may be discharged through the venting gate 121, may pass through the passage 322 of the horizontal beams 320, may be directly induced to the rupture portion 500, and may be discharged to the outside. By this, the heat generated by the battery module 100 on the position 1 may be discharged to the outside without giving an influence to the peripheral module.

Further, when heat is generated in the battery module 100 disposed on the position 2 in FIG. 5, as shown in FIG. 7A and FIG. 7B, the high-temperature and high-pressure gas and flames are discharged through the venting gate 121, and are input to the passage 322 of the horizontal beams 320. The high-temperature and high-pressure gas and flames having been input to the passage 312 of the vertical beams 310 through the second connection hole 314 and having moved along the passage 312 may be induced to the horizontal beams 320 on the side where the rupture portion 500 is positioned and may be finally discharged to the outside through the rupture portion 500 through the second connection hole 314 formed on the opposite end of the corresponding vertical beams 310. That is, when heat is generated in the battery module 100, high-temperature and high-pressure gas and flames may be induced and may be finally discharged to the outside on the passage of the venting inducing frame 300 through the first connection hole 324 positioned the nearest the venting gate 121 of the corresponding battery module 100.

Referring to FIG. 7B, the passage of the venting gate 121 and the passage of the rupture portion 500 may be formed to cross each other. When the passages of the venting gate 121 and the rupture portion 500 are positioned in the same line, the high-temperature and high-pressure gas and flames having passed through the venting gate 121 are transmitted to the rupture portion 500, so the rupture side 510 shown in FIG. 7B may be easily broken and the rupture portion 500 may be damaged. According to the present embodiment, the passage of the rupture portion 500 and the passage of the venting gate 121 cross each other, the high-temperature and high-pressure gas and flames having passed through the venting gate 121 may pass through the passage in the venting inducing frame 300 formed to be vertical to the direction of the passage of the venting gate 121, and may be induced to the rupture portion 500 formed to be vertical to the venting inducing frame 300, and the high-temperature and high-pressure gas and flames reach the rupture portion 500 according to a direction switching, so the pressure transmitted to the rupture side 510 is reduced, and the high-temperature and high-pressure gas and flames may be stably discharged to the rupture portion 500.

A battery pack in which a quenching member is formed according to an embodiment of the present invention will now be described.

Figure 8:
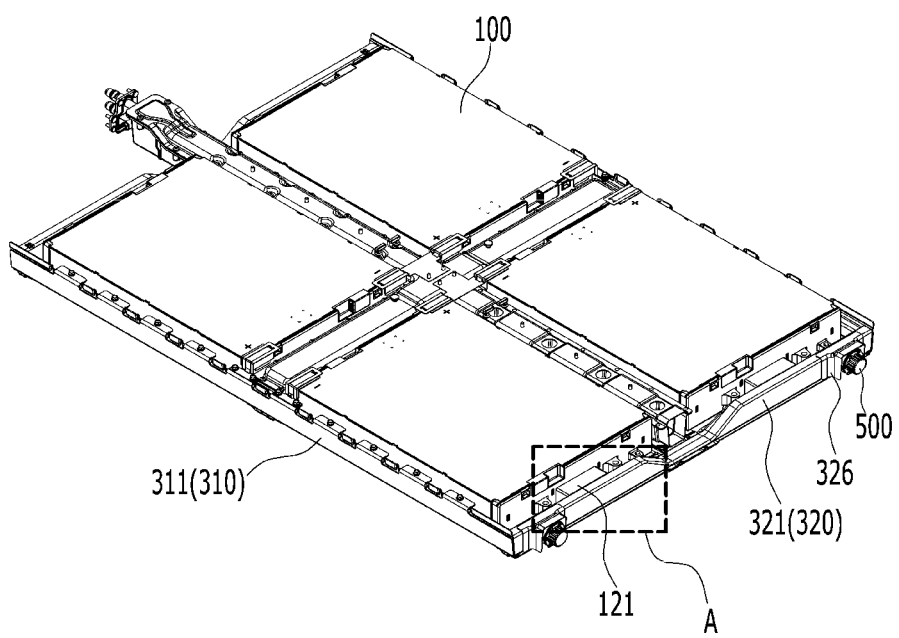
FIG. 8 shows a perspective view in which a venting inducing frame according to an embodiment of the present invention is disposed along an edge of a plurality of battery modules.
Figure 9:
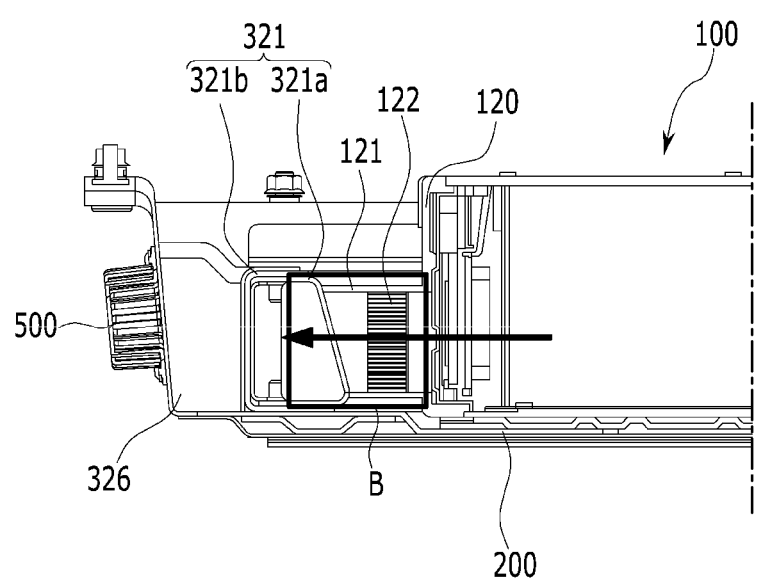
FIG. 9 shows a portion of A of FIG. 8.
Figure 10:
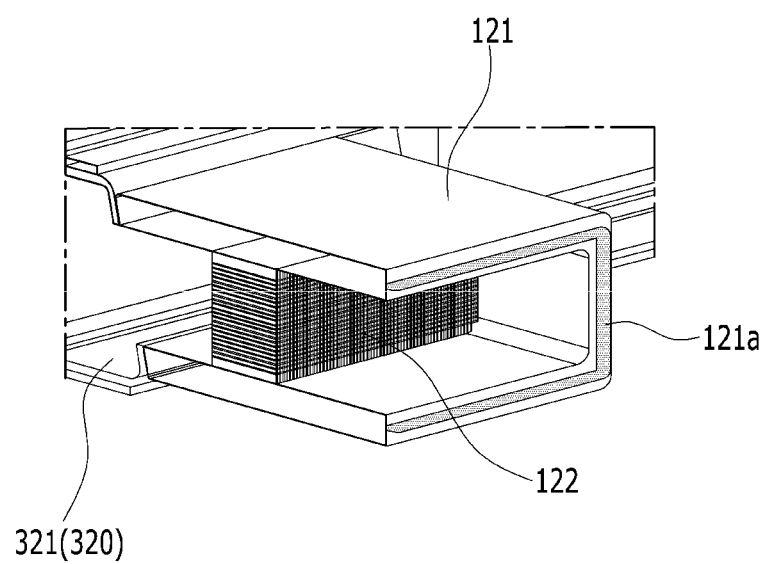
FIG. 10 shows a portion of B of FIG. 9.

FIG. 8 shows a perspective view in which a venting inducing frame according to an embodiment of the present invention is disposed along an edge of a plurality of battery modules. FIG. 9 shows a portion A of FIG. 8. FIG. 10 shows a portion B of FIG. 9.

According to an embodiment, a quenching member 122 may be formed on the passage of the venting gate 121. The quenching member 122 may be formed of a quenching mesh. The quenching mesh may be formed to have different structures and different materials depending on intensity of the flames generated from the battery cell or types of materials generated from the battery cell. When the quenching member 122 is disposed on the passage of the venting gate 121 in a like way of the present embodiment, and gas and flames are generated from the battery module 100, the flames may pass through the quenching member 122 and may then become extinct, and the gas may pass through the passages of the venting inducing frame 300 and may be discharged to the rupture portion 500. Therefore, the flames are filtered by the quenching member 122, and the gas is discharged to the outside of the battery pack, so the secondary damage applied to the device in which the battery pack according to the present embodiment is installed may be minimized.

Referring to FIG. 9 and FIG. 10, the quenching member 122 may be formed to cover the passage of the venting gate 121. Further, it may be designed to have a predetermined thickness to sufficiently absorb the flames passing through the quenching member 122. As shown in FIG. 10, a gate gasket 121a may be formed between the venting gate 121 and the end plate 120. The gate gasket 121a may prevent high-temperature and high-pressure gas and flames from going between the venting gate 121 and the end plate 120 by sealing a space between the venting gate 121 and the end plate 120, and may allow the same to be discharged to a specific portion through the venting inducing frame 300 and the rupture portion 500.

Figure 11:
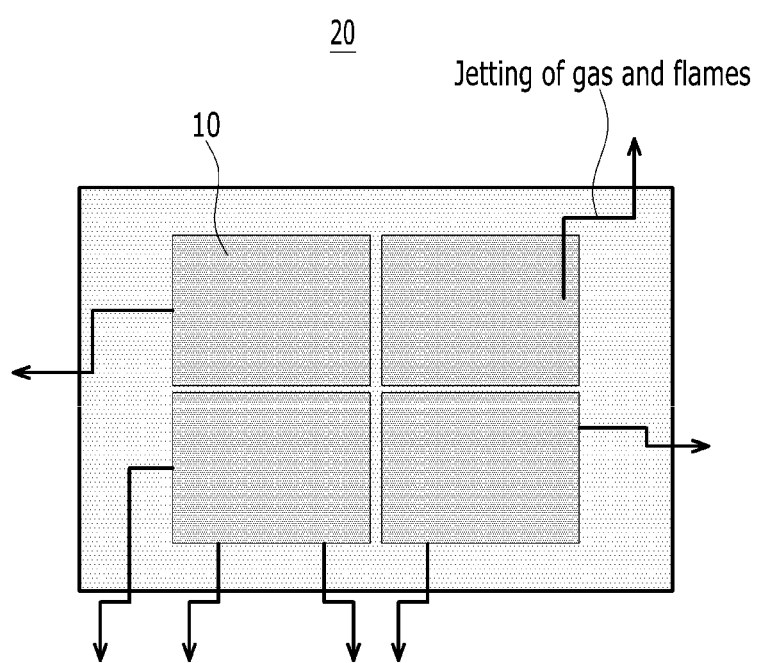
FIG. 11 shows a schematic diagram on a flow of venting gas when an abnormal phenomenon is generated from a battery pack according to a comparative example.
Figure 12:
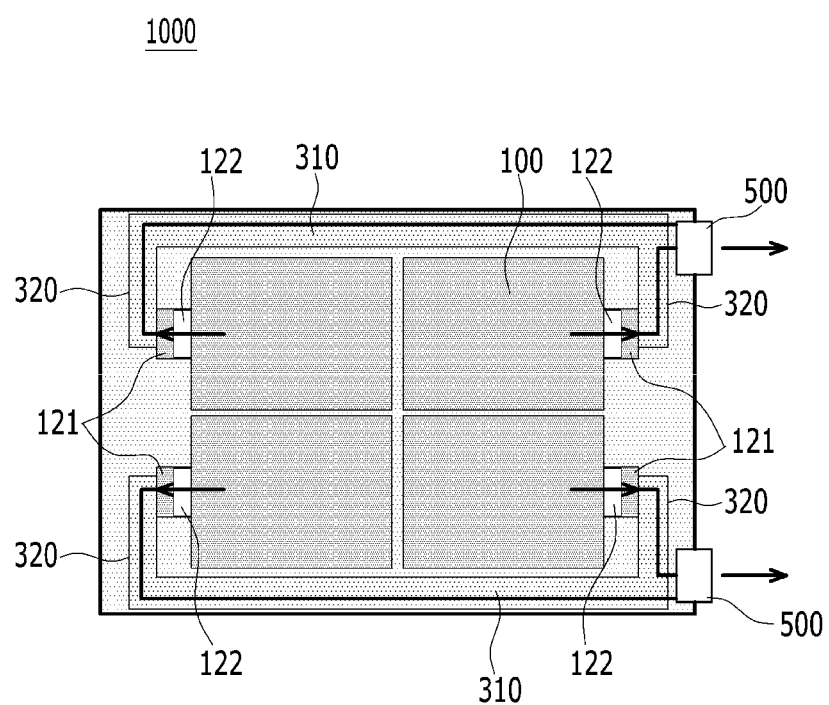
FIG. 12 shows a schematic diagram on a flow of venting gas when an abnormal phenomenon is generated from a battery pack according to an embodiment of the present invention.

FIG. 11 shows a schematic diagram on a flow of venting gas when an abnormal phenomenon is generated from a battery pack according to a comparative example. FIG. 12 shows a schematic diagram on a flow of venting gas when an abnormal phenomenon is generated from a battery pack according to an embodiment of the present invention.

Referring to FIG. 11, the conventional battery pack 20 does not have systems such as the venting gate and the venting inducing frame according to embodiments of the present invention, so the venting gas generated by the battery module 10 may be sporadically discharged.

Referring to FIG. 12, when an abnormal phenomenon is generated in an initial battery cell in the battery pack 1000 according to the present embodiment, the venting gas in the battery module 100 is discharged to the outside of the battery module 100 through the venting gate 121, the venting gas in the battery pack 1000 may be controlled and safety may be increased by the system connected for each unit and inducing the venting gas by the venting inducing frame 300 including a pair of vertical beams 310 and a pair of horizontal beams 320.

Further, a quenching member 122 is formed for each passage of the venting gate 121 connected to the battery module 100, flames is absorbed through the quenching member 122, and gas may be discharged to the outside by the venting inducing frame 300, thereby minimizing the collateral damage outside the battery pack.

The above-described battery module and the battery pack including the same are applicable to various types of devices. The devices include transport means such as electric bicycles, electric vehicles, and hybrid vehicles, but the present invention is not limited thereto, and it may be applied to various devices that use the battery module and the battery pack including the same, which also belongs to the scope of the present invention.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

121: venting gate
121a: gate gasket
122: quenching member
200: pack tray
300: venting inducing frame
310: vertical beams
320: horizontal beams
311: cover of vertical beams
312: passage of vertical beams
321: cover of horizontal beams
322: passage of horizontal beams
324: first connection hole
314: second connection hole
326: third connection hole
400: housing
500: rupture portion

The invention claimed is:

1. A battery pack comprising:
a plurality of battery modules;
a venting inducing frame disposed along edges of the plurality of battery modules and forming a venting passage to vent at least one of gas and flame;
a venting gate to connect an inside of at least one of the plurality of battery modules and the venting inducing frame;
a pack housing accommodating the plurality of battery modules and the venting inducing frame, and
a quenching member disposed in a passage of the venting gate,
wherein the venting inducing frame includes a pair of first beams formed in parallel to a first direction and a pair of second beams formed in parallel to a second direction traversing the first direction,
wherein the plurality of battery modules are disposed on a bottom surface of the pack housing along at least one of the first direction and the second direction, respectively, and
wherein the venting gate extends outward from the at least one of the plurality of battery modules and is inserted into the venting inducing frame.

2. The battery pack of claim 1, wherein the quenching member is made of a quenching mesh.

3. The battery pack of claim 1,
wherein the first beams and the second beams respectively have a pipe shape and include a cover formed in length directions of the first beams and the second beams, and the venting passage surrounded by the cover and formed to allow the at least one of gas and flame to pass through.

4. The battery pack of claim 3, wherein at least one rupture portion connected to the venting passage is further included on an outside of one of the second beams and the first beams.

5. The battery pack of claim 4, wherein the passage of the venting gate and a passage of the rupture portion are formed to cross each other.

6. The battery pack of claim 4, wherein the at least one rupture portion includes a wing portion connected to at least one of the first beams and the second beams, the wing portion protruding from pack housing, and
wherein the wing portion includes parallel slits to pass the at least one of gas and flame in a radial direction of the wing portion.

7. The battery pack of claim 3, wherein the cover of the second beams includes at least one connection hole facing at least one of the plurality of battery modules, and
wherein the venting gate is formed so that the venting gate communicates with the second beams facing the at least one connection hole.

8. The battery pack of claim 3, wherein a connection hole communicating with a passage of another of the first beams and the second beams is installed on a cover of one of the first beams and the second beams on a portion where the first beams traverse the second beams.

9. The battery pack of claim 1,
wherein the pack housing includes an upper cover and a lower housing, and
wherein a pack gasket is formed between the upper cover and the lower housing.

10. The battery pack of claim 1, wherein the plurality of battery modules include an end plate for covering a battery cell stacked body exposed on a front side and a rear side of a module frame of each battery module,
wherein an opening is formed in a part of the end plate, and
wherein the venting gate is connected to the opening of the end plate, and protrudes away from an outer planar surface of the end plate.

11. The battery pack of claim 10, wherein a gate gasket is formed between the venting gate and the end plate.

12. The battery pack of claim 10, wherein the venting gate is tubular, and an open end of the venting gate is separated from the outer planar surface of the end plate by a passage of the venting gate.

13. A device comprising a battery pack according to claim 1.

14. The battery pack of claim 1, wherein each second beam includes a second internal cover adjacent the plurality of battery modules and a second external cover adjacent the pack housing,
wherein each of the second internal cover and the second external cover includes an upper surface, a lower surface, and a wall surface that connects the upper surface to the lower surface, respectively, and
wherein the upper surface of the second internal cover and the upper surface of the second external cover are coupled by overlapping each other, and the lower surface of the second internal cover and the lower surface of the second external cover are coupled by overlapping each other.

15. A battery module comprising:
a module frame having an interior to accommodate at least one battery cell;
an end plate connected to the module frame;
a venting gate protruding away from an outer planar surface of the end plate, the venting gate having an open end and a passage that communicate with the interior of the module frame;
a quenching member having a plurality of stacked layers and configured to extinguish flames and discharge gas; and
wherein the venting gate extends outward from the battery module and is configured to be inserted into a venting inducing frame.

16. A battery pack comprising:
the battery module according to claim 15;
the venting inducing frame encircling the battery module, and having a venting passage to vent at least one of gas and flame generated by the at least one battery cell; and
a rupture portion communicating with the venting passage.

17. The battery module of claim 15, wherein the venting gate is tubular, and the open end of the venting gate is separated from the outer planar surface of the end plate by the passage.

* * * * *